(12) United States Patent
Dick et al.

(10) Patent No.: US 10,427,228 B2
(45) Date of Patent: Oct. 1, 2019

(54) DYNAMIC SAW LUBRICATION SYSTEM

(71) Applicant: Precision Automation, Inc., Vancouver, WA (US)

(72) Inventors: Spencer B. Dick, Portland, OH (US); Melissa L. Covel, Vancouver, WA (US)

(73) Assignee: Precision Automation, Inc., Vancouver, WA (US)

( * ) Notice: Subject to any disclaimer, the term of this patent is extended or adjusted under 35 U.S.C. 154(b) by 72 days.

(21) Appl. No.: 15/280,934

(22) Filed: Sep. 29, 2016

(65) Prior Publication Data
US 2017/0087650 A1    Mar. 30, 2017

Related U.S. Application Data

(60) Provisional application No. 62/234,531, filed on Sep. 29, 2015.

(51) Int. Cl.
| | |
|---|---|
| *B23D 59/02* | (2006.01) |
| *B23D 61/02* | (2006.01) |
| B23D 45/06 | (2006.01) |
| B27B 5/24 | (2006.01) |
| B23Q 11/10 | (2006.01) |

(52) U.S. Cl.
CPC ............ *B23D 59/02* (2013.01); *B23D 61/02* (2013.01); *B23D 45/065* (2013.01); *B23Q 11/10* (2013.01); *B27B 5/243* (2013.01); *Y10T 83/263* (2015.04)

(58) Field of Classification Search
CPC ........... B27B 5/24; B27B 5/243; B23D 59/02; B23D 59/00; B23D 45/06–45/068; Y10T 83/263; B23Q 11/10–11/12
See application file for complete search history.

(56) References Cited

U.S. PATENT DOCUMENTS

| | | | |
|---|---|---|---|
| 2,726,688 A | 12/1955 | Flood | |
| 3,808,922 A | 5/1974 | Ohlhoff | |
| 4,222,295 A | 9/1980 | Sawamura | |
| 4,807,361 A | 2/1989 | Raczkowski | |
| 4,962,588 A | 10/1990 | Fushiya et al. | |
| 5,444,634 A | 8/1995 | Goldman et al. | |
| 5,678,466 A | 10/1997 | Wahl | |

(Continued)

FOREIGN PATENT DOCUMENTS

| | | | | |
|---|---|---|---|---|
| EP | 2708302 A1 * | 3/2014 | ........... | B23D 45/066 |
| WO | 2004011204 A2 | 2/2004 | | |

OTHER PUBLICATIONS

Thang, Nguyen Doc; '1700 Animated Mechanical Mechanisms With Images, Brief explanations and Youtube links—Part 2 Other kinds of motion transmission'; Dec. 2014; pp. 50-82.*

(Continued)

*Primary Examiner* — Evan H MacFarlane
(74) *Attorney, Agent, or Firm* — Kolisch Hartwell, P.C.

(57) ABSTRACT

A lubrication system for a saw may include a lubricator that is mechanically linked to a traveling arm of a saw, such as an up-cut saw. Movement of the saw blade through a first path may result automatically in movement of the lubricator through a second path transverse to the first path. This coupled movement may result in a relatively consistent distance between the lubricator and the periphery of the saw blade, especially as compared with a stationary lubricator.

9 Claims, 16 Drawing Sheets

(56) References Cited

U.S. PATENT DOCUMENTS

| | | |
|---|---|---|
| 7,025,543 B2 | 4/2006 | Curtis |
| 7,073,244 B2 | 7/2006 | Olari et al. |
| 8,074,543 B2 | 12/2011 | Hyatt et al. |
| 8,910,552 B2 | 12/2014 | Hogan |
| 8,931,378 B2 | 1/2015 | Paulson et al. |
| 2005/0284277 A1* | 12/2005 | Casella .................. B26D 7/24 83/488 |

OTHER PUBLICATIONS

McCarthy, JM, Geometric Design of Linkages, 2011, Springer, pp. 15-53 (Year: 2011).*

Engineering Exchange, 11 Principles and Guidelines in Design for Manufacturing and Assembly, Jul. 12, 2014, https://www.engineeringexchange.com/profiles/blogs/11-principles-and-guidelines-in-design-for-manufacturing-and, retrieved Feb. 7, 2019 (Year: 2014).*

Danfoss A/S, Nessie Saw Blade Cooling and Dust Binding System—Why and How to Calculate!, Article, Nov. 2003, 6 pages.

UNIST, Saw Blade Lube Systems—Cutting Edge Technology, Brochure, retrieved from the internet at: http://unist.com/uploads/LIT/sawbladelubesystemLIT.pdf, on Sep. 15, 2015, 12 pages.

* cited by examiner

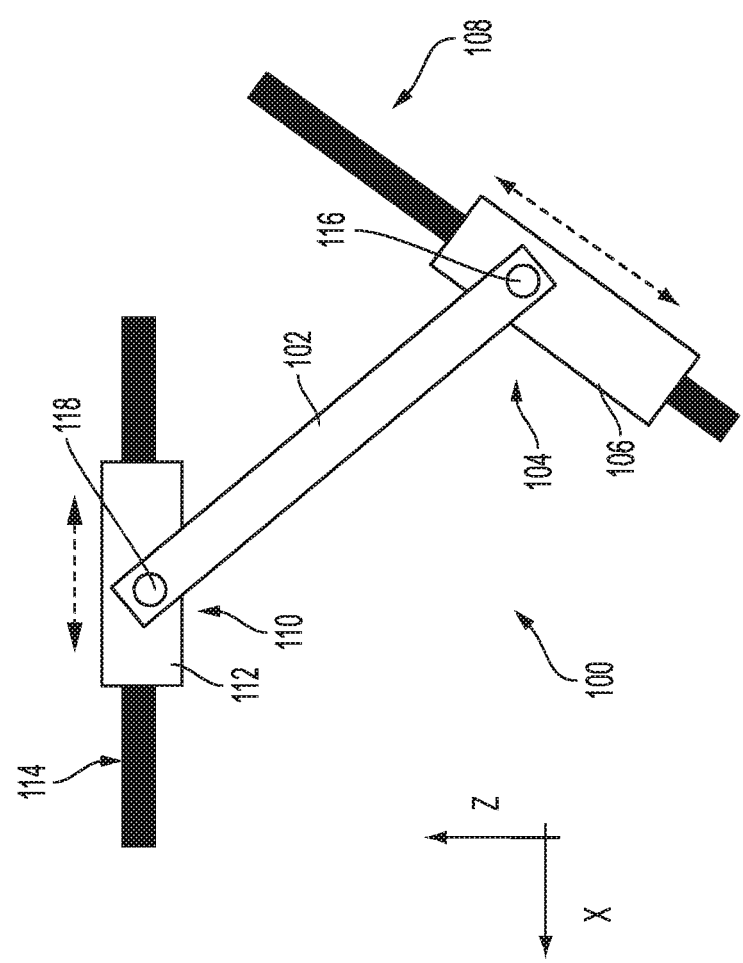

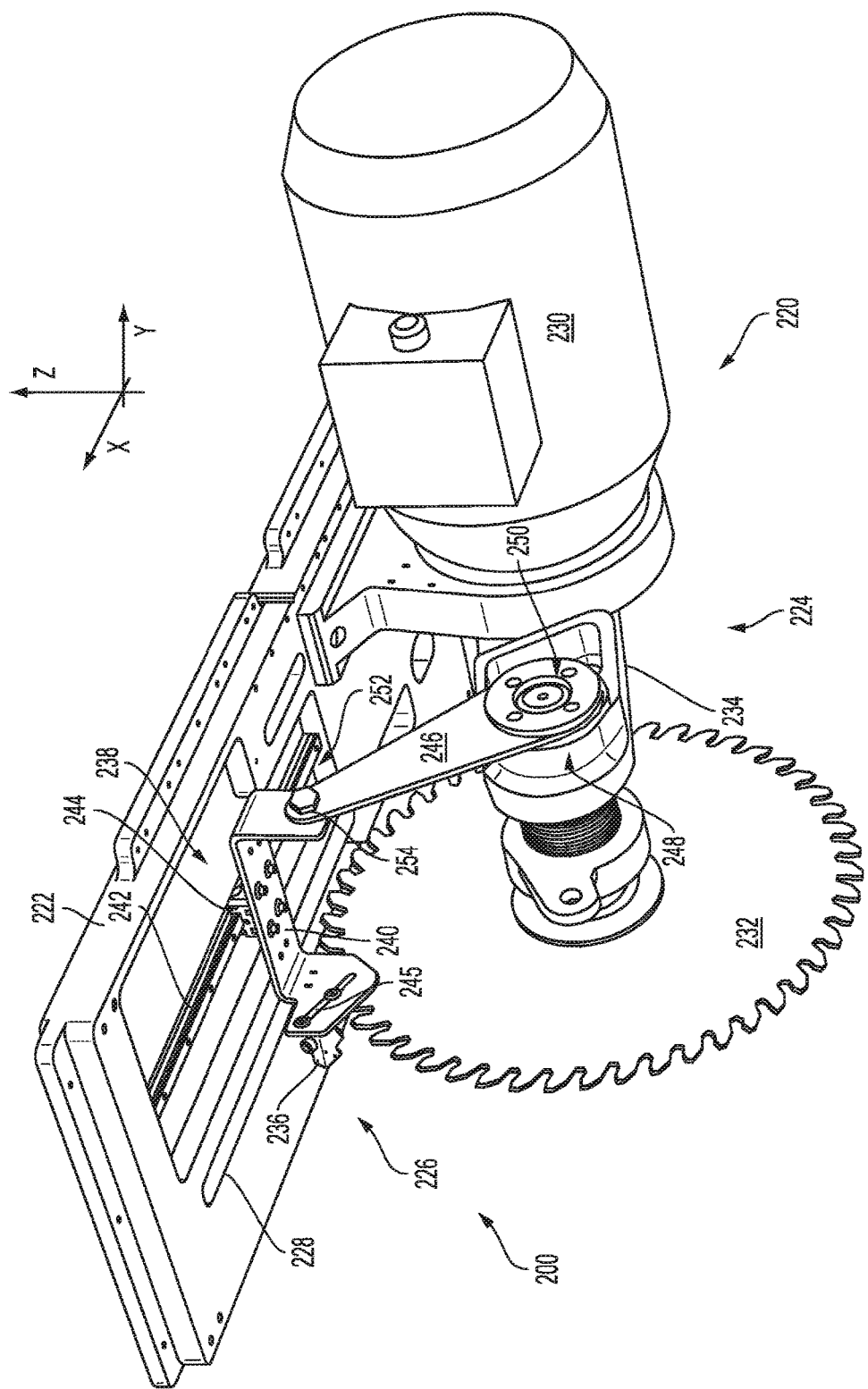

DYNAMIC SAW LUBRICATION SYSTEM

CROSS-REFERENCES

This application claims the benefit under 35 U.S.C. § 119(e) of the priority of U.S. Provisional Patent Application Ser. No. 62/234,531, filed Sep. 29, 2015, the entirety of which is hereby incorporated by reference for all purposes.

FIELD

This disclosure relates to systems and methods for lubricating traveling circular saw blades.

INTRODUCTION

Rotating circular saws are used throughout industries to cut workpieces made of wood, ferrous metal, non-ferrous metal, and other materials. In some applications, such as when cutting metals, the rotating blades must be lubricated. Such lubrication is ideally applied as close to the cutting operation as possible. However, in saws having blades that travel, the lubrication applicator must be mounted such that it does not mechanically interfere with the blade. In other words, a blade might move toward and away from an applicator, resulting in uneven or inconsistent lubrication.

SUMMARY

The dynamic saw lubrication systems described herein include lubricators that may be automatically repositioned by a mechanically linkage to ensure that the lubrication nozzle remains a suitable distance from a periphery of the saw blade as the blade travels up and down. The present disclosure provides systems, apparatuses, and methods relating to such dynamic saw lubrication systems. In some embodiments, a saw according to the present teachings may include a lubrication nozzle configured to lubricate a periphery of a saw blade of an up-cut saw, the lubrication nozzle being coupled to a sliding bearing defining a first path; and a mechanical linkage having a first end coupled to the lubrication nozzle and a second end coupled to a traveling arm carrying the saw blade of the up-cut saw, wherein the traveling arm is movable along a second path transverse to the first path; wherein the mechanical linkage is configured to convert motion of the traveling arm along the second path into motion of the lubrication nozzle along the first path.

In some embodiments, a lubrication system for an up-cut saw may include a lubrication nozzle coupled to a bearing carriage of a linear bearing; and a mechanical linkage having a first end portion coupled to the lubrication nozzle and a second end portion configured to be connected to an arbor arm of an up-cut saw; wherein the mechanical linkage is configured to mechanically convert rotational motion of the arbor arm into linear motion of the lubrication nozzle along the linear bearing.

In some embodiments, a method for lubricating a saw blade mounted to a traveling arm of a saw may include: applying lubricant, using a spray nozzle, to a periphery of a circular saw blade mounted to a traveling arm of a saw, wherein the spray nozzle is mounted to a table of the saw by a sliding joint; moving the saw blade relative to the table through a first path using the traveling arm; and causing the spray nozzle to move through a second path along the sliding joint using a mechanical linkage coupled at a first end to the spray nozzle and coupled at a second end to the traveling arm.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a schematic diagram of an illustrative third mechanical linkage suitable for use in the system of FIG. 1.

FIG. 5 is a lower oblique isometric view of an illustrative saw and lubrication system in accordance with aspects of the present disclosure.

DESCRIPTION

Figure 1:
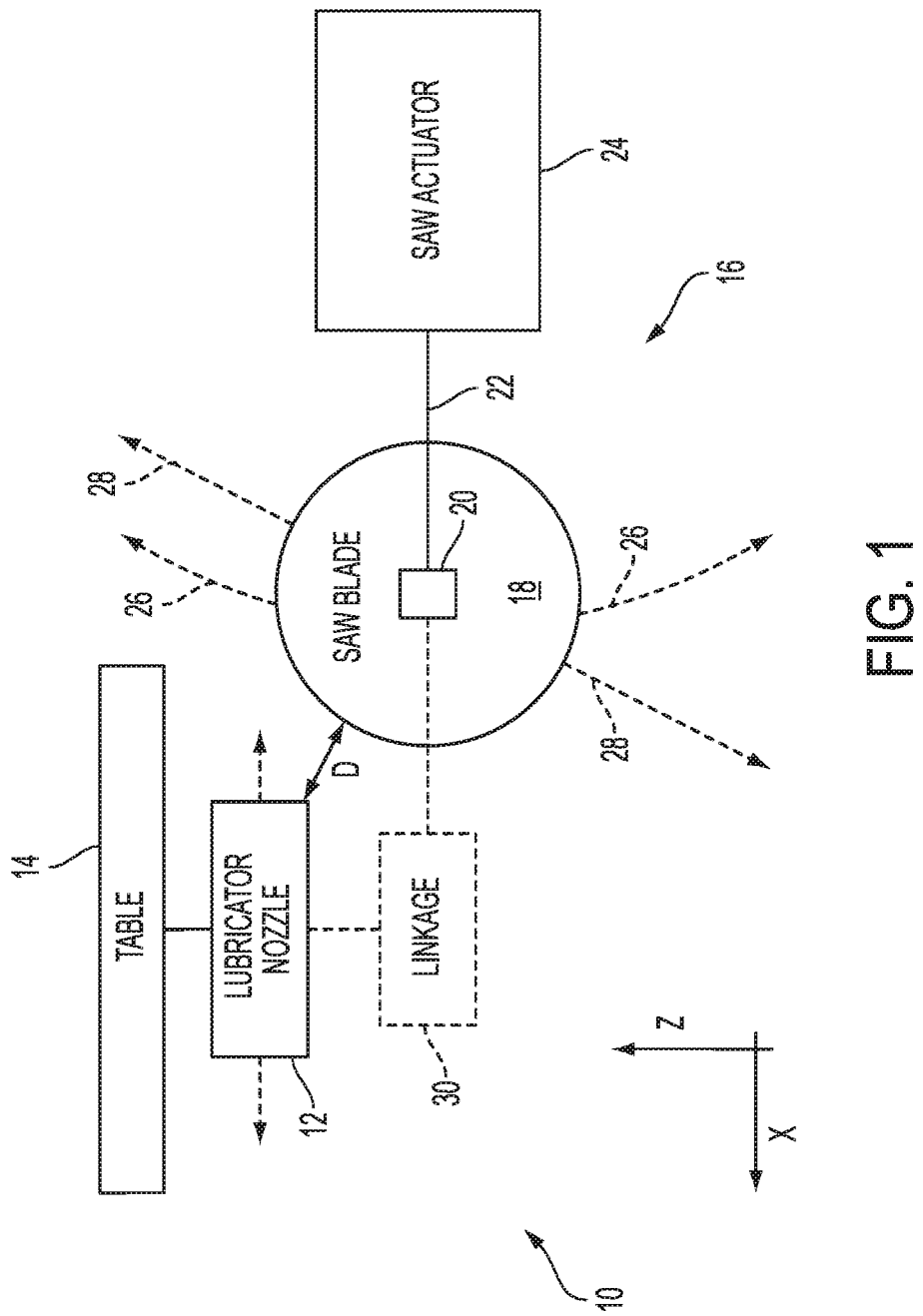
FIG. 1 is a schematic diagram of an illustrative saw lubrication system according to the present teachings.

Various embodiments of a dynamically positioned saw lubrication system, as well as related methods, are described below and illustrated in the associated drawings. Unless otherwise specified, a saw lubrication system and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar saw lubrication systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Directional terms such as "up," "down," "vertical," "horizontal," and the like should be understood in the context of the particular saw assembly as it is used in typical operation. For example, a table saw may be disposed in an upright position on a support surface, such as a floor. Using standard X-Y-Z axis notation, an X-Y plane generally parallel to the floor or table surface may define horizontal. Continuing with the same example, vertical may be defined as along the Z axis, with up being the positive Z direction and down being the negative Z direction.

A "revolute" joint or connection is a rotational, mechanical connection between two bodies, resulting in a single degree of freedom. Examples include hinges, folding joints, pivots, pin joints, and the like. A revolute joint may be referred to as a pivoting joint.

A "prismatic" joint or connection is a linear, sliding, mechanical connection between two bodies, resulting in up to two degrees of freedom. A single-axis sliding joint may be formed, e.g., by concentric cylinders, in which case both rotation and longitudinal sliding may be possible (i.e., two degrees of freedom). In other examples, a sliding joint may be formed by members having a polygonal cross section, thereby providing sliding but preventing rotation (i.e., one degree of freedom). Examples include linear rail bearings, piston cylinders, sliding dovetail joints, and the like.

Overview

In general, and with reference to the schematic diagram of FIG. 1, a dynamic saw lubrication system 10 may include a lubrication nozzle 12, which is supplied by a lubrication source (not shown). Lubrication nozzle 12 may be movable with respect to a support structure (e.g., legs, cabinet, etc.) and/or a table 14 of a saw assembly 16. For example, the nozzle may be attached to the table by way of a linear bearing, or any other suitable prismatic joint. In this example, nozzle 12 is movable along an X axis (see FIG. 1).

In this example, saw 16 is a so-called "up saw" or "up-cut saw" in that a circular saw blade 18 is configured to rise up from under table 14 to cut a workpiece in an upward direction. Up-cut saws may be activated by a foot pedal (e.g., rather than by pulling the saw down onto the workpiece as in a chop saw), and the mechanical portions of the saw may be largely contained within a cabinet or other support structure of the saw. Accordingly, this type of saw may be desirable to free the operator's hands and/or to use the workspace more efficiently.

To achieve upward motion, blade 18 is attached to an arbor 20 of a traveling arm 22, which is operatively connected to a saw actuator 24. Saw actuator 24 may include any suitable structures and devices configured to spin saw blade 18 and to move (e.g., slide or pivot) traveling arm 22 up and down as needed. For example, saw actuator 24 may be configured to pivot or slide the traveling arm using hydraulic and/or pneumatic systems.

Traveling arm 22 forms a rigid link between the actuator and the saw blade. Accordingly, in examples where the traveling arm pivots, pivoting the arm causes the saw blade to move in an arc 26, i.e., along an arcuate path having an axis at the actuator end of the arbor arm. Absent any other mechanism, this rotational movement would cause saw blade 18 to move toward and away from nozzle 12 with respect to the X axis (as shown in FIG. 1). In other words, if lubrication nozzle 12 is held stationary, a distance D between nozzle 12 and the perimeter/circumference of saw blade 18 would vary as the blade travels through arc 26. This would result in uneven or variable lubrication of the blade. A similar situation exists in examples where traveling arm 22 instead moves along a linear path 28 that is tilted, slanted, or angled with respect to the lubrication nozzle.

To remedy this situation, a mechanical linkage 30 operatively connects traveling arm 22 to nozzle 12. Mechanical linkage 30 may include any suitable components and/or devices configured to convert the rotational or other generally vertical traveling motion of arm 22 into linear, generally horizontal motion of nozzle 12. This arrangement causes the nozzle to move in concert with the saw blade. Because the nozzle rides on a sliding connection, motion of the nozzle along the X axis can correspond (e.g., mirror) the X-axis component of the saw blade's motion. For example, linkage 30 may be configured such that the nozzle remains a substantially constant distance from blade 18. In other words, a distance D remains roughly the same, regardless of the position of the saw blade. In other examples, distance D may vary in accordance with a selected relationship based on the design of the linkage.

In some examples, mechanical linkage 30 may include a planar linkage having rigid links. The one or more joints in linkage 30 may be pivoting (i.e., revolute) joints, sliding (i.e., prismatic) joints, spherical joints, cam mechanisms, and/or the like, or any combination of these. Each of the joints of linkage 30 may be fixed or floating (i.e., free, moving). One or more of the joints of linkage 30 may be constrained, restrained, and/or restricted. Linkage 30 may include one or more rigid links. Because linkage 30 is connected to traveling arm 22 and to the sliding lubrication nozzle 12, the combination of any two or all three of these elements (12, 22, and 30) may also be described as a mechanical linkage.

Figure 3:
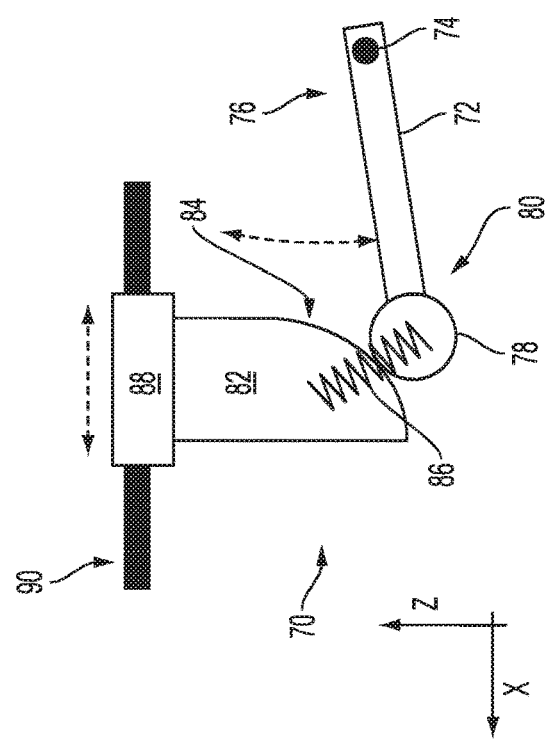
FIG. 3 is a schematic diagram of an illustrative second mechanical linkage suitable for use in the system of FIG. 1.
Figure 2:
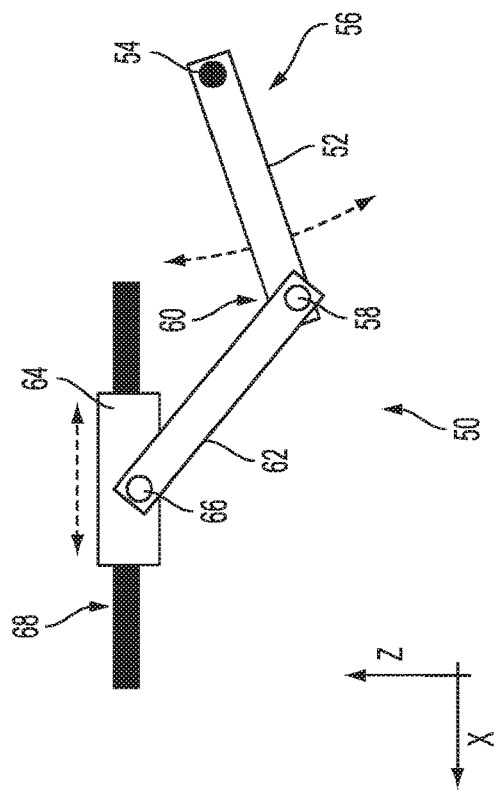
FIG. 2 is a schematic diagram of an illustrative first mechanical linkage suitable for use in the system of FIG. 1.

Turning to specific suitable implementations of linkage 30, FIGS. 2-4 are schematic diagrams of selected linkages suitable for use in system 10. Illustrative embodiments of each linkage are described in following sections of the present disclosure.

FIG. 2 is a schematic diagram of a pivoting mechanical linkage 50 including a pivoting version of traveling arm 22. Linkage 50 includes a first rigid link 52 having a fixed revolute joint 54 at a proximal end 56 of the link and a floating or free revolute joint 58 at a distal end 60 of the link. First rigid link 52 corresponds to the pivoting version of traveling arm 22. Fixed joints such as joint 54 are fixed with respect to the structure of the saw, while floating joints such as joint 58 are only attached to the links they respectively join. In the drawings, a fixed joint is indicated by a solid black shape, and a floating joint is indicated by an unfilled shape (i.e., an outline). This convention is used throughout FIGS. 2-4.

Distal end 60 of link 52 may be attached, at joint 58, to a second rigid link 62. Rigid link 62 is in turn connected to a sliding member 64 by a floating revolute joint 66 at the other end of link 62. Member 64 is movable along a linear path on a fixed prismatic joint 68.

This arrangement allows conversion of a rotational motion into a linear motion. Specifically, if link 52 is pivoted around (or about) joint 54, distal end 60 of link 52 will travel through an arcuate path, as indicated in FIG. 2. Second rigid link 62, which is constrained at an upper end to travel in a linear path, will be forced to pivot at both joints (58 and 66), resulting in a pushing or pulling force on member 64. Member 64 corresponds to lubrication nozzle 12. In this example, linkage 30 of system 10 comprises second rigid link 62 and its floating revolute joints 58 and 66.

FIG. 3 is a schematic diagram of a cam operated mechanical linkage 70. Linkage 70 includes a rigid link 72 having a fixed revolute joint 74 at a proximal end 76 of the link and a cam follower 78 at a distal end 80 of the link. As in FIG. 2, fixed joints such as joint 74 are fixed with respect to the structure of the saw, and are indicated by a solid black shape. As in FIG. 2, link 72 may correspond to the traveling arm of the saw, as described in further detail above. Cam follower 78 may be in contact with a cam portion 82, and may be configured to follow the cam portion, such as via a rolling interface. Cam portion 82 may be a rigid plate or other structure having a curved edge surface 84 (i.e., a cam surface) for interfacing with cam follower 78. Edge surface 84 may be contoured such that pivoting of rigid link 72 about joint 74 causes cam follower 78 to move cam portion 82 toward or away from joint 74 (i.e., along a linear path). To bias the cam follower against the cam surface, and to facilitate movement of the cam portion toward joint 74, a spring or other biasing member 86 may be used to couple cam portion 82 to cam follower 78 (or rigid link 72).

Cam portion 82 may be fixed or otherwise coupled to a sliding member 88, which is movable along a linear path on a fixed prismatic joint 90. As with linkage 50, this arrangement allows conversion of a rotational motion into a linear motion. Specifically, if link 72 is pivoted around (or about) joint 74, then distal end 80 of link 72 will travel through an arcuate path, as indicated in FIG. 3. Cam portion 82, which is constrained at an upper end to travel in a linear path, will be forced in a direction along the X axis, resulting in a pushing or pulling force on member 88. Member 88 corresponds to lubrication nozzle 12. In this example, linkage 30 of system 10 comprises cam follower 78 and cam portion 82.

FIG. 4 is a schematic diagram of a mechanical linkage 100 similar to linkage 50, but in which the traveling arm is non-pivoting. Linkage 100 includes a rigid link 102 pivotally coupled at a first (proximal) end 104 to a first sliding member 106 having a first prismatic joint 108, and at a second (distal) end 110 to a second sliding member 112 having a second prismatic joint 114. Specifically, link 102 has a first floating revolute joint 116 at the proximal end of the link and a second floating revolute joint 118 at the distal end of the link. These two joints are floating, in that they are movable with respect to the main structure of the saw. However, they may be constrained, e.g., to a plane of motion.

Link 102 is connected to first sliding member 106 by joint 116. First sliding member 106 is movable along a linear path on first fixed prismatic joint 108. First sliding member 106 may correspond to the traveling arm of the saw.

Link 102 is further connected to second sliding member 112 by joint 118. Second sliding member 112 is movable along a different linear path, on second fixed prismatic joint 114. The linear path of prismatic joint 114 is generally aligned with the X axis. The path defined by first prismatic joint 108 is transverse to the path defined by second prismatic joint 114, as shown in FIG. 4. In this example, the paths of joints 108 and 114 remain parallel to the X-Z plane. Other configurations are possible.

Similar to linkages 50 and 70, this arrangement allows conversion of motion along a first path into a linear motion along a second path transverse to the first. Specifically, if sliding member 106 (e.g., a saw blade on a traveling arm) is moved along joint 108, link 102 will be forced to pivot and thereby force sliding member 112 (e.g., a lubrication nozzle) in a direction along the X axis.

Examples, Components, and Alternatives

The following sections describe selected aspects of exemplary dynamic saw lubrication systems as well as related systems and/or methods. The examples in these sections are intended for illustration and should not be interpreted as limiting the entire scope of the present disclosure. Each section may include one or more distinct examples, and/or contextual or related information, function, and/or structure.

First Illustrative Saw and Lubrication System

As shown in FIGS. 5-12, this section describes a dynamic saw lubrication system 200 for an up-cut saw, the system including a pivoting mechanical linkage. Saw lubrication system 200 is an example of lubrication system 10, described above. Additionally, lubrication system 200 includes a mechanical linkage analogous to linkage 50, described above. Accordingly, similar components may be labeled with similar reference numbers.

Figure 6:
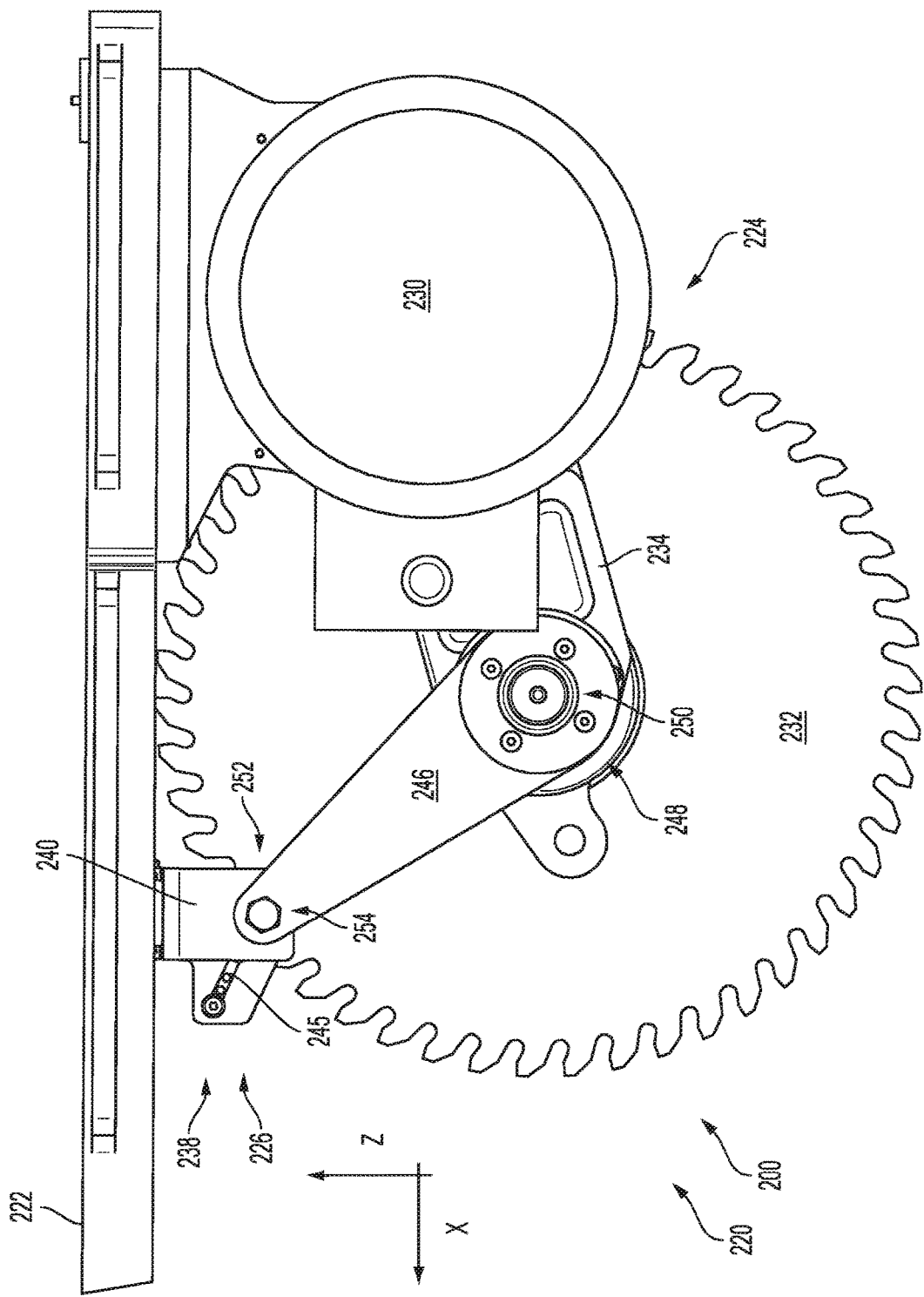
FIG. 6 is a side elevation view of the saw of FIG. 5, showing the saw blade in a lowered position.
Figure 7:
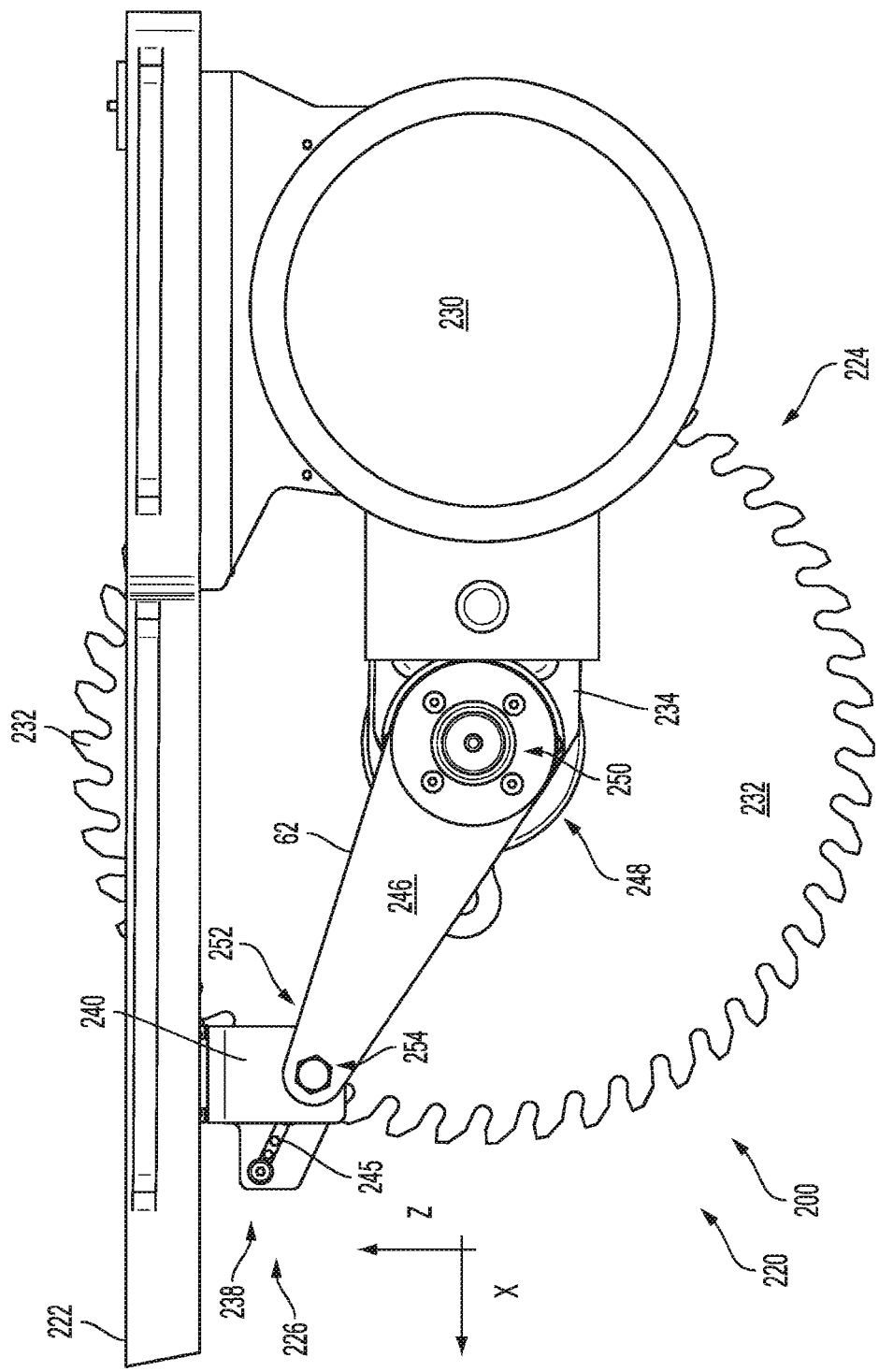
FIG. 7 is a side elevation view of the saw of FIG. 5, showing the saw blade in a raised position.
Figure 8:
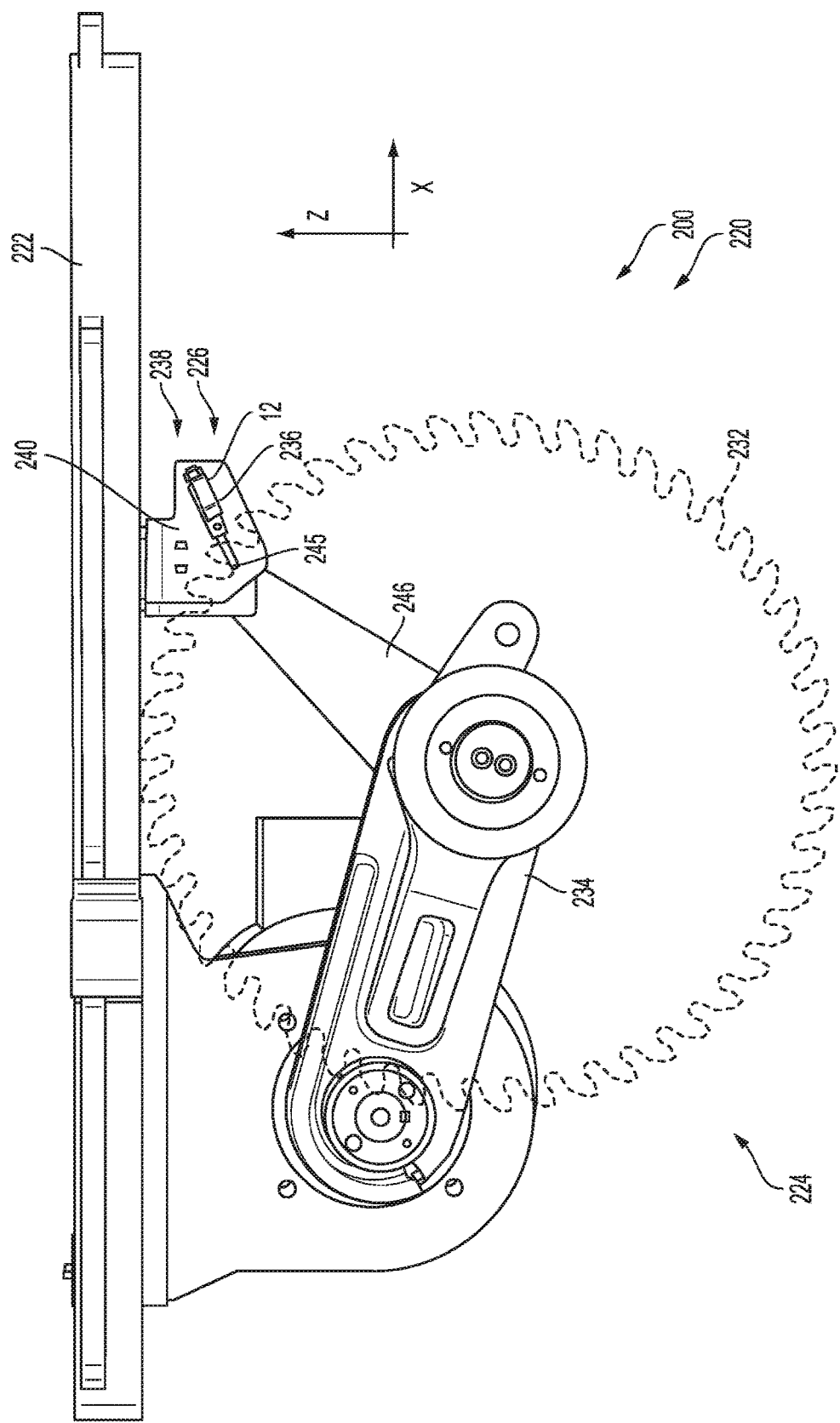
FIG. 8 is a side elevation view of the saw of FIG. 5, taken from an opposite side of the saw as compared to FIGS. 6 and 7.
Figure 9:
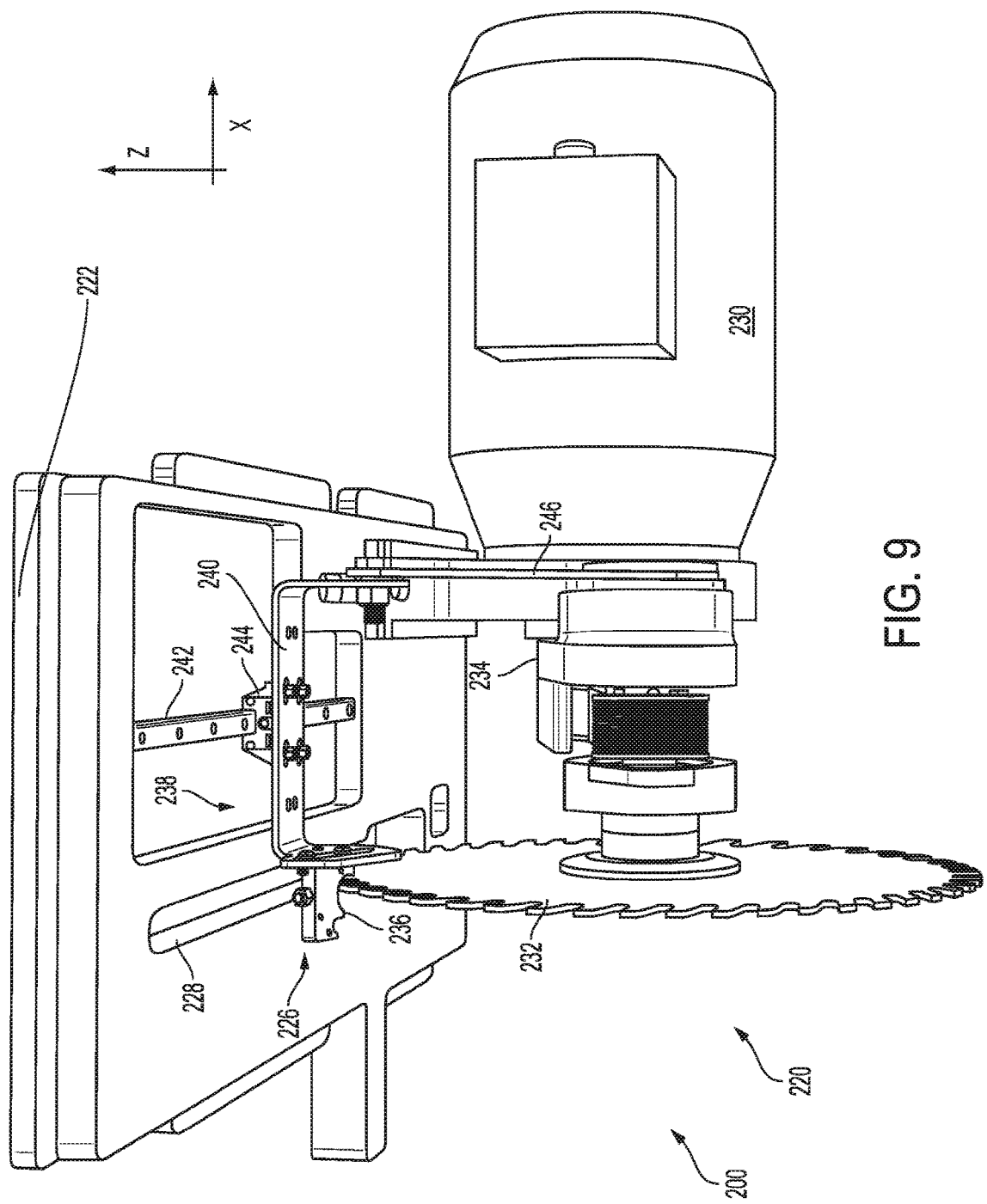
FIG. 9 is an end view of the saw of FIG. 5 from below the plane of the table.
Figure 10:
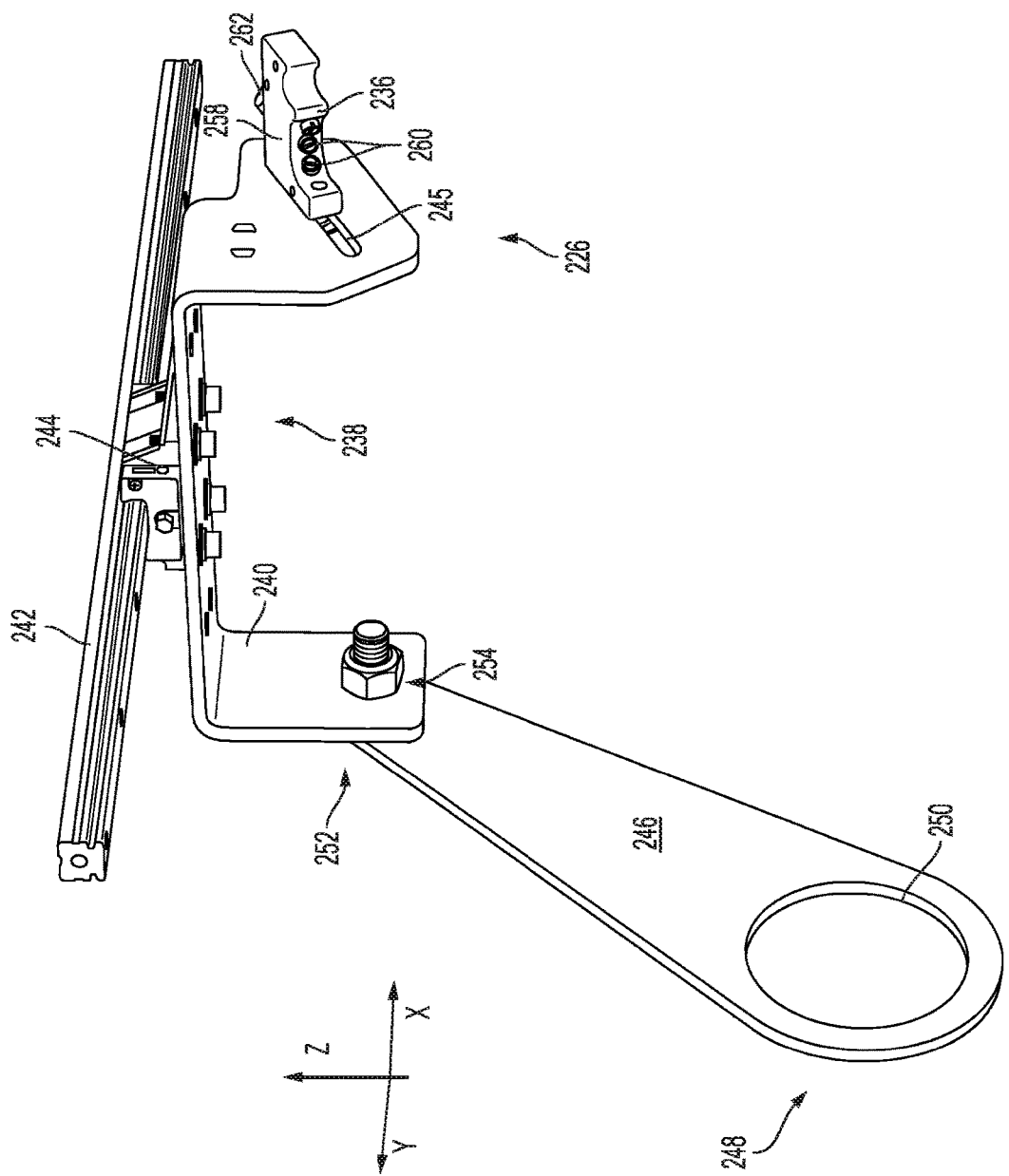
FIG. 10 is an isometric view of a portion of the saw of FIG. 5, showing a lubrication assembly and pivot arm.
Figure 11:
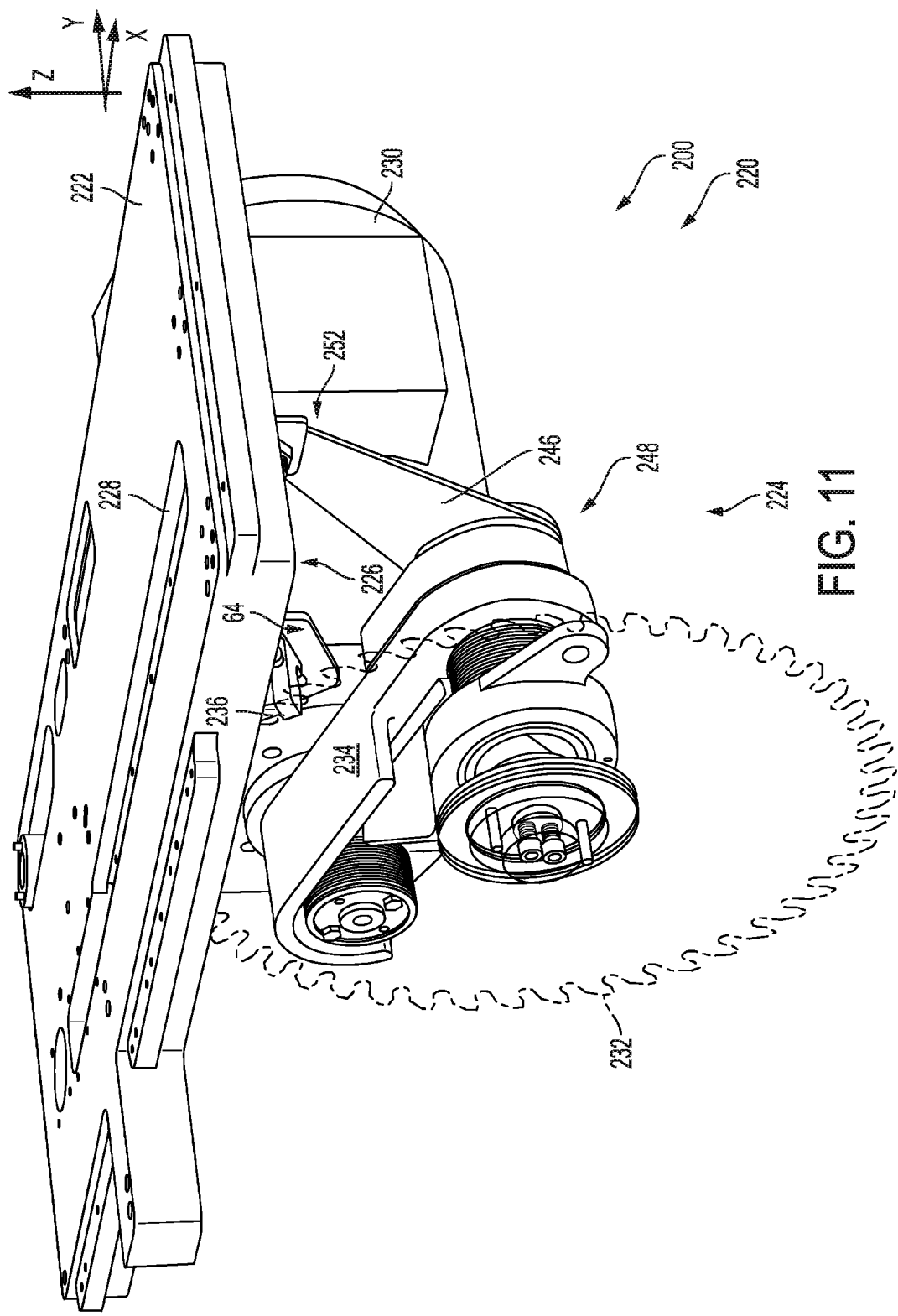
FIG. 11 is an upper oblique isometric view of the saw of FIG. 5.
Figure 12:
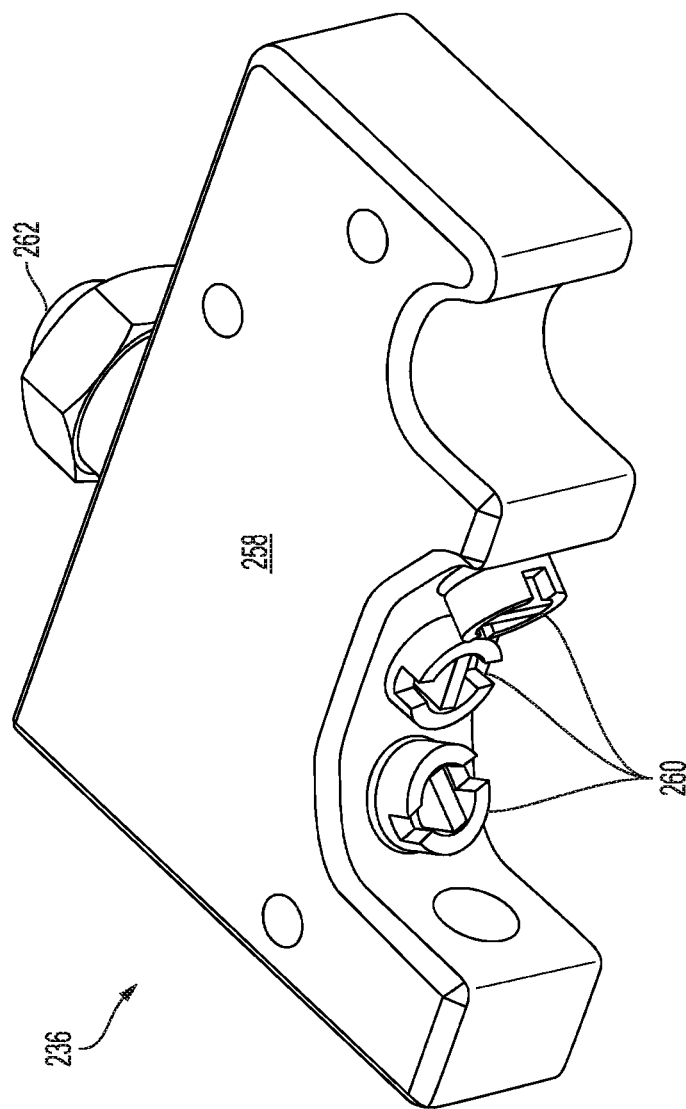
FIG. 12 is an isometric view of an illustrative lubrication nozzle suitable for use in a dynamic saw lubrication system in accordance with aspects of the present disclosure.

FIGS. 5-12 depict various aspects of an illustrative saw 220 which incorporates a mechanical linkage similar to pivoting mechanical linkage 50. Saw 220 includes a table portion 222, a saw assembly portion 224, and a positionable lubricator assembly 226. FIG. 5 is an isometric view of saw 220 from a vantage point below the level of table portion 222. An enclosure and support structure, which would typically surround the saw assembly and support the table, has been omitted from the drawings for clarity. FIG. 6 is a side view of saw 220 with the saw blade in a lowered position. FIG. 7 is a side view of saw 220 with the saw blade in a raised position. FIG. 8 is a side view of saw 220 taken from an opposite side, with the blade in phantom outline to permit viewing of otherwise hidden elements. FIG. 9 is an end view of saw 220, showing lateral relationships between components. FIG. 10 is an isometric view of a portion of saw 220, described below. FIG. 11 is an oblique view of saw 220 taken from above the plane of table portion 222. FIG. 12 is an isometric view of a lubricator nozzle suitable for use in system 200 (and others).

Table portion 222 may include any suitable expanse or support surface having an opening 228 (e.g., a slot) therein. Opening 228 may be sized and configured to allow passage of a saw blade up through the table, for the purpose of cutting a workpiece supported on the table.

Saw assembly portion 224 of saw 220 may be securely attached, directly or indirectly, to table 222 (or vice versa). For example, saw assembly portion 224 may be mounted to an underside of table 222. Saw assembly portion 224 may include any suitable components, structures, and/or devices configured to power and position a saw blade for cutting a workpiece on table 222. In this example, saw assembly portion 224 includes a motor 230, a circular saw blade 232, and an arbor arm 234 (also referred to as a traveling arm) connecting the blade and the motor.

Motor 230 may include any suitable motor, e.g., an electric motor such as an induction motor, configured to spin blade 232 at one or more selected speeds (e.g., rpm). Saw blade 232 may include any suitable circular saw blade, and may include interchangeable saw blades selectable based on, for example, workpiece characteristics. In some examples, the saw blade may be chosen for its ability to cut a metal workpiece (e.g., ferrous or non-ferrous metals).

Arbor arm 234 (also referred to as a traveling arm), which is an example of a traveling arm 22, may include any suitable rigid, pivotable arm having a proximal end coupled to the motor or motor mounting area and a distal end having a mount or spindle (e.g., an arbor) for saw blade 232. Arbor arm 234 may have a length allowing blade 232 to pivot through slot 228. Arbor arm 234 may be pivoted by a pneumatic, hydraulic, and/or mechanical actuator (e.g., a motor and gearbox).

Lubrication (or lubricator) assembly 226, which is best seen in isolation in FIG. 10, may include any suitable components, structures, and/or devices configured to mechanically couple a lubrication nozzle to the saw in such a way that the lubrication nozzle is movable along a substantially horizontal path that parallels a plane defined by the saw blade's path. The lubrication assembly can then be mechanically linked to the arbor arm, such that the lubrication nozzle is mechanically repositioned, automatically, as a result of saw blade travel. In the example shown, lubrication assembly 226 includes a lubrication nozzle 236 coupled to a carriage assembly 238. As shown in FIG. 10 and elsewhere, carriage assembly 238 is pivotably coupled to a rigid pivot arm 246. Pivot arm 246, in turn, is pivotably coupled to arbor arm 234, as described further below.

Lubrication nozzle 236 (and corresponding lubrication nozzles in other illustrative systems described below) may include any suitable lubricator nozzle or nozzles—see FIG. 12. For example, lubrication nozzle 236 may comprise a lubricator block 258 known as a Bat Nozzle, made by UNIST, Inc., which includes multiple spray tips 260 to apply lubricant from various angles. A lubricant dispensing unit (not shown) may be connected to the lubricator block, such as by ⅛" tubing, at an inlet port 262, and lubricant may be metered out pneumatically. The lubricant may include an oil-based lubricant configured to reduce heat build-up and help prevent sticky aluminum chips from "welding" to the blade. This may be particularly important during cutting of aluminum workpieces. In some examples, flood coolant may be used. In some examples, a cold air nozzle may be included instead of or in addition to the lubrication nozzle. Such a cold air nozzle may be configured to cool the blade, as well as blow off chips attached to the blade.

Carriage assembly 238 may include any suitable structures configured to carry nozzle 236 and to form a prismatic joint with respect to table 222. In this example, carriage assembly 238 includes a bridge portion 240 carrying the lubrication nozzle, and a bearing portion comprising a linear rail 242 and a corresponding bearing carriage 244 coupled to the rail.

Rail 242 is fixed to table 222, and oriented along the X axis (i.e., parallel to the plane of the saw blade or saw blade path). Carriage 244 rides on rail 242, and is attached to bridge portion 240, such that bridge portion 240 is movable along the X axis by sliding back and forth along a length of rail 242.

Bridge portion 240 may include any suitable structure configured to bridge the lateral (Y-axis) distance between pivot arm 246 and saw blade 232, providing an offset connection between the pivot arm and the nozzle. The path of saw blade 232 may be laterally offset from the plane of the pivot arm. As shown in the drawings, the pivot arm may be on one side of arbor arm 234, while the saw is mounted to the other side. Accordingly, bridge portion 240 spans the distance between pivot arm 246 and the path of the saw, such that the lubrication nozzle can be aligned with the saw blade. In the example shown, bridge portion 240 has an inverted "U" shape, with the upper, horizontal portion of the bridge being attached to the linear bearing. Bridge 240 may also include a slotted adjustment feature 245, as shown in the drawings. Adjustment of the bridge position may be performed, for example, to bring the nozzle generally closer to or farther away from the saw blade.

Rigid pivot arm 246 is coupled to arbor arm 234 at a first (proximal) end portion 248 by a first rotating or pivoting joint 250, and to carriage assembly 238 at a second (distal) end portion 252 by a second rotating or pivoting joint 254. First rotating or pivoting joint 250 and the arbor are coaxial with one another, as can be seen by comparing FIGS. 6 and 7. As described above with respect to linkage 50, the resulting mechanical linkage will convert rotational or pivoting motion of arbor arm 234 into linear motion of lubrication nozzle 236, such that the lubrication nozzle will remain substantially the same distance from saw blade 232 as the blade travels through its arcuate path.

As should be evident from the description above, arbor arm 234 is analogous to first link 52, pivot arm 246 is analogous to second link 62, and the components of carriage assembly 238 are analogous to sliding member 64 and joint 68.

Second Illustrative Saw and Lubrication System

Figure 13:
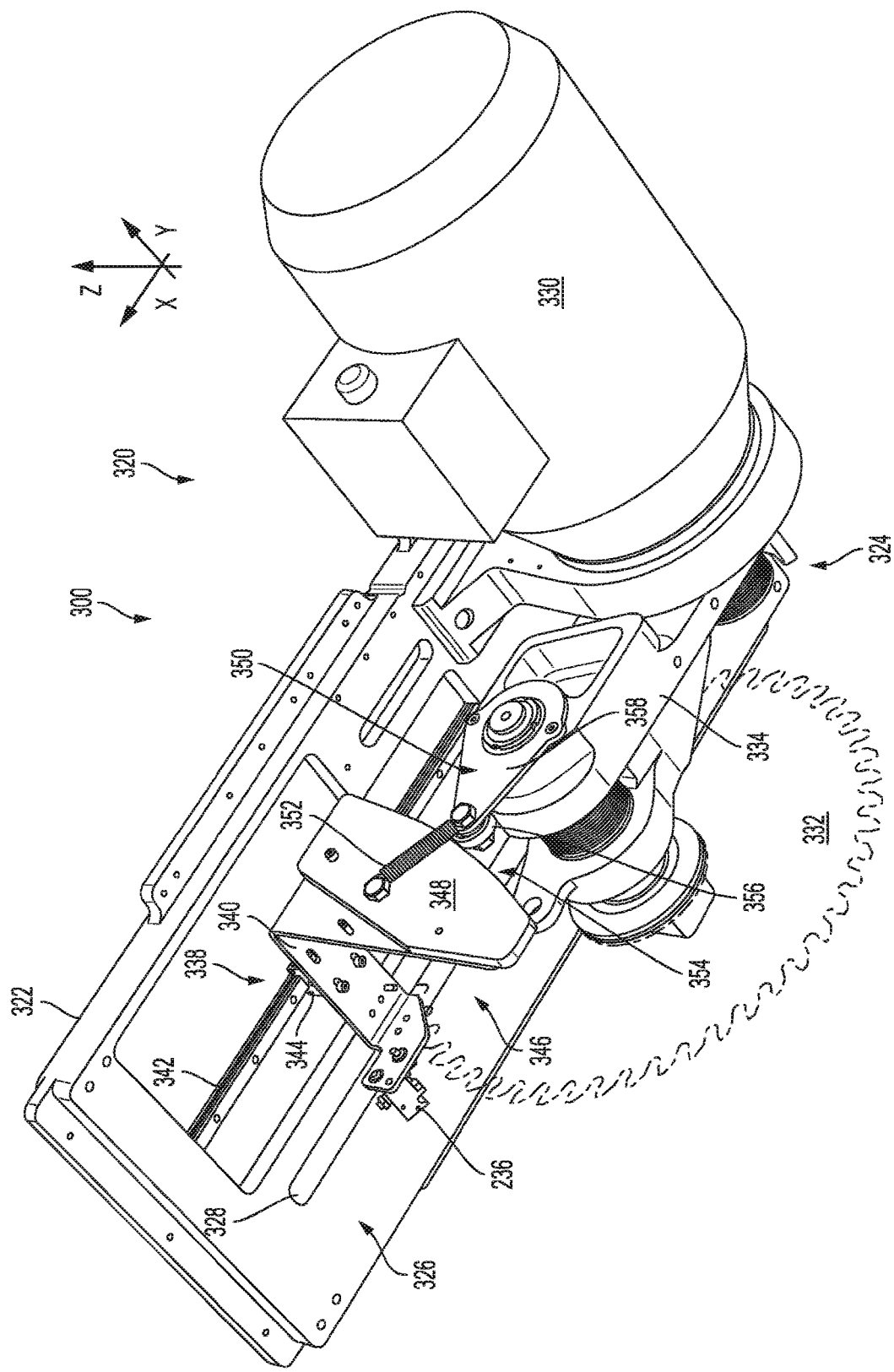
FIG. 13 is a lower oblique isometric view of another illustrative saw and lubrication system in accordance with aspects of the present disclosure.
Figure 14:
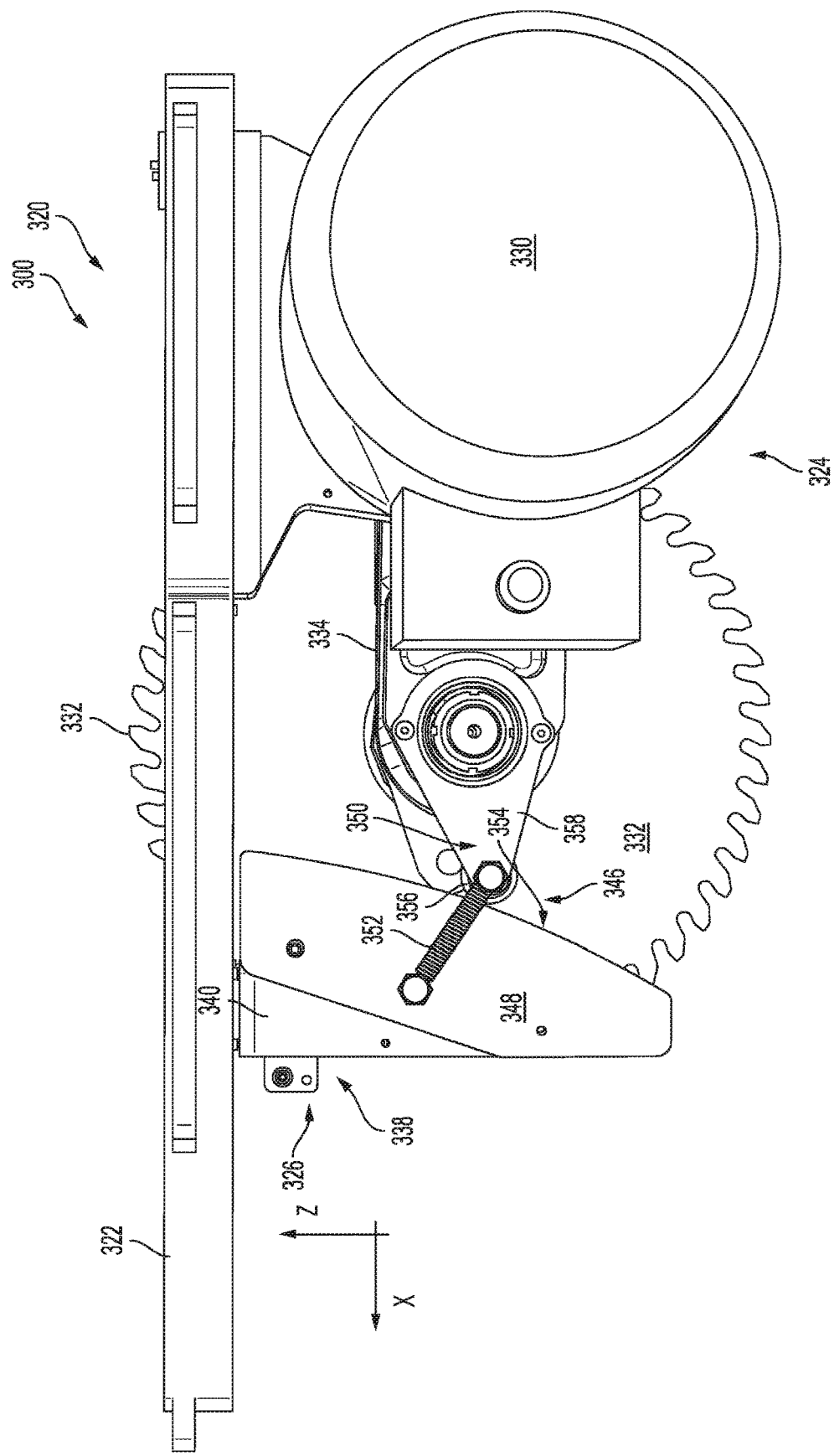
FIG. 14 is a side elevation view of the saw of FIG. 13, with the saw blade in a raised position.
Figure 15:
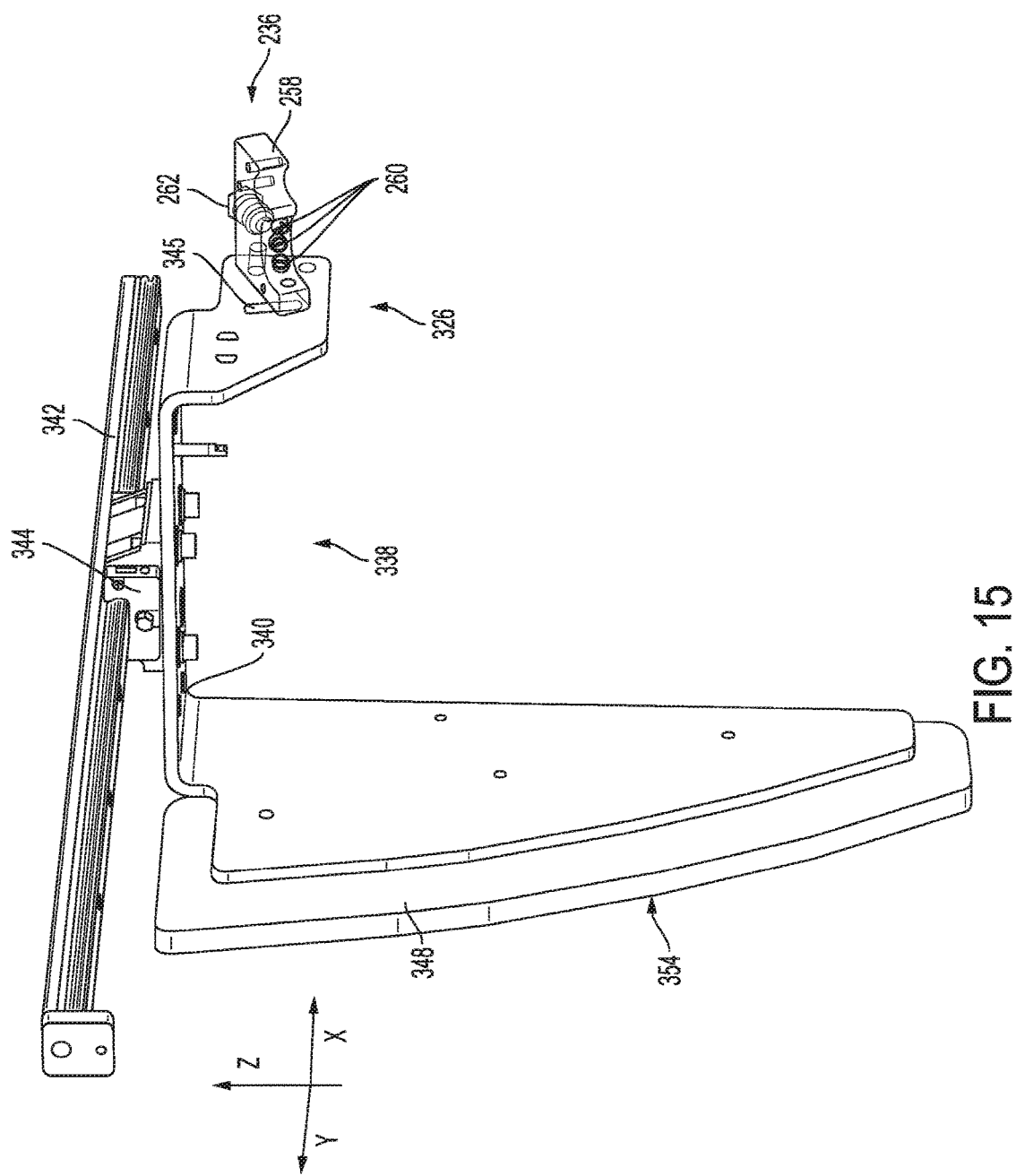
FIG. 15 an isometric view of a portion of the saw of FIG. 13, showing a lubrication assembly and part of a cam mechanism.

As shown in FIGS. 13-15, this section describes a dynamic saw lubrication system 300 for an up-cut saw, the system including a mechanical linkage having a cam mechanism. Saw lubrication system 300 is an example of lubrication system 10, described above. Additionally, lubrication system 300 includes a mechanical linkage analogous to linkage 70, described above. Accordingly, similar components may be labeled with similar reference numbers.

FIGS. 13-15 show various aspects of an illustrative saw 320. Apart from the type of mechanical linkage, saw 320 is substantially identical to saw 220. Accordingly, saw 320 includes a table portion 322, a saw assembly portion 324, and a positionable lubricator assembly 326, all substantially as described above with respect to saw 220. FIG. 13 is an isometric low-oblique view of saw 320 (i.e., from a vantage point below the level of table portion 322). As above, an enclosure and support structure has been omitted from the drawings for clarity. FIG. 14 is a side view of saw 320 with the saw blade in a raised position. FIG. 15 is an isometric view of a portion of saw 320, described below.

Table portion 322 may include any suitable expanse or support surface having a slot 328 therein. Opening 328 may be sized and configured to allow passage of a saw blade up through the table, for the purpose of cutting a workpiece supported on the table.

Saw assembly portion 324 of saw 320 may be securely attached, directly or indirectly, to table 322 (or vice versa). For example, saw assembly portion 324 may be mounted to an underside of table 322. Saw assembly portion 324 may include any suitable components, structures, and/or devices configured to power and position a saw blade for cutting a workpiece on table 322. In this example, saw assembly portion 324 includes a motor 330, a circular saw blade 332, and an arbor arm 334 (also referred to as a traveling arm) connecting the blade and the motor.

Motor 330 may include any suitable motor, e.g., an electric motor such as an induction motor, configured to spin blade 332 at one or more selected speeds (e.g., rpm). Saw blade 332 may include any suitable circular saw blade, and may include interchangeable saw blades selectable based on, for example, workpiece characteristics. As described above, the saw blade may be chosen for its ability to cut a metal workpiece (e.g., ferrous or non-ferrous metals).

Arbor arm 334, which is another example of a traveling arm 22, may include any suitable rigid, pivotable arm having a proximal end coupled to the motor or motor mounting area and a distal end having a mount or spindle (e.g., an arbor) for saw blade 332. Arbor arm 334 may have a length allowing blade 332 to pivot through slot 328.

Lubrication (or lubricator) assembly 326, which is best seen in isolation in FIG. 15, may include any suitable components, structures, and/or devices configured to mechanically couple a lubrication nozzle to the saw in such a way that the lubrication nozzle is movable along a substantially horizontal path that parallels a plane defined by the saw blade's path. The lubrication assembly can then be mechanically linked to the arbor arm, such that the lubrication nozzle is mechanically repositioned, automatically, as a result of saw blade travel. In the example shown, lubrication assembly 326 includes a lubrication nozzle 236 coupled to a carriage assembly 338. As shown in FIG. 15 and elsewhere, carriage assembly 338 is coupled to a cam mechanism 346. A rigid cam portion 348 of mechanism 346 is attached to the carriage assembly. Cam portion 348, in turn, is coupled to a cam follower 350 on arbor arm 334, as described further below.

Lubrication nozzle 236 may include any suitable lubricator nozzle or nozzles (see FIG. 12), and related accessories, as described above regarding lubrication nozzle 236.

Carriage assembly 338 may include any suitable structures configured to carry nozzle 236 and to form a prismatic joint with respect to table 322. In this example, carriage assembly 338 includes a bridge portion 340 carrying the lubrication nozzle, and a bearing portion comprising a linear rail 342 and a corresponding bearing carriage 344 coupled to the rail.

Rail 342 is fixed to table 322, and oriented along the X axis (i.e., parallel to the plane of the saw blade or saw blade path). Carriage 344 rides on rail 342, and is attached to bridge portion 340, such that bridge portion 340 is movable along the X axis by sliding back and forth along a length of rail 342.

Bridge portion 340 may include any suitable structure configured to bridge the lateral (Y-axis) distance between cam mechanism 346 and saw blade 332, providing an offset connection between the cam mechanism and the nozzle. The path of saw blade 332 may be laterally offset from the plane of the pivot arm. As shown in the drawings, cam follower 350 may be coupled to one side of arbor arm 334, while the saw is mounted to the other side. Accordingly, bridge portion 340 spans the distance between cam mechanism 346 and the path of the saw, such that the lubrication nozzle can be aligned with the saw blade. In the example shown, bridge portion 340 has an inverted "U" shape, with the upper, horizontal portion of the bridge being attached to the linear bearing. Bridge 340 may also include a slotted adjustment feature 345, as shown in the drawings. Adjustment of the bridge position may be performed, for example, to bring the nozzle generally closer to or farther away from the saw blade.

Turning to cam mechanism 346 in particular, the mechanism includes cam portion 348, cam follower 350, and a biasing member, also referred to as a tension/extension spring 352. Cam portion 348 depends substantially vertically from bridge 340, and has a cam surface 354 in the form of a curved edge facing follower 350. Cam follower 350 includes a roller 356 coupled by a rigid extension plate 358 to arbor arm 334 of the saw. Roller 356 is configured to follow curved edge 354 of cam portion 348. In some examples, cam follower 350 may include a sliding portion, e.g., comprising a low friction material, instead of or in addition to roller 356. In some examples, additional rollers may be present. In some examples, the positions of the cam portion and the cam follower may be reversed, within the cam mechanism, such that the cam roller, e.g., is coupled to the bridge portion and the cam portion is coupled to the arbor arm.

Spring 352 may include any suitable elastic member configured to pull cam portion 348 toward cam follower 350, such that cam follower 350 maintains contact with curved edge 354.

As described above, the mechanical linkage in this example will convert rotational or pivoting motion of arbor arm 334 into linear motion of lubrication nozzle 236, using cam mechanism 346. As in the previous example, the lubrication nozzle will remain substantially the same distance from the saw blade as the blade travels through its arcuate path.

As should be evident from the description above, arbor arm 334 is analogous to rigid link 72 of linkage 70, the components of cam mechanism 346 are analogous to cam portion 82, biasing member 86, and cam follower 78, and the components of carriage assembly 388 are analogous to sliding member 88 and joint 90.

Third Illustrative Saw and Lubrication System

Figure 16:
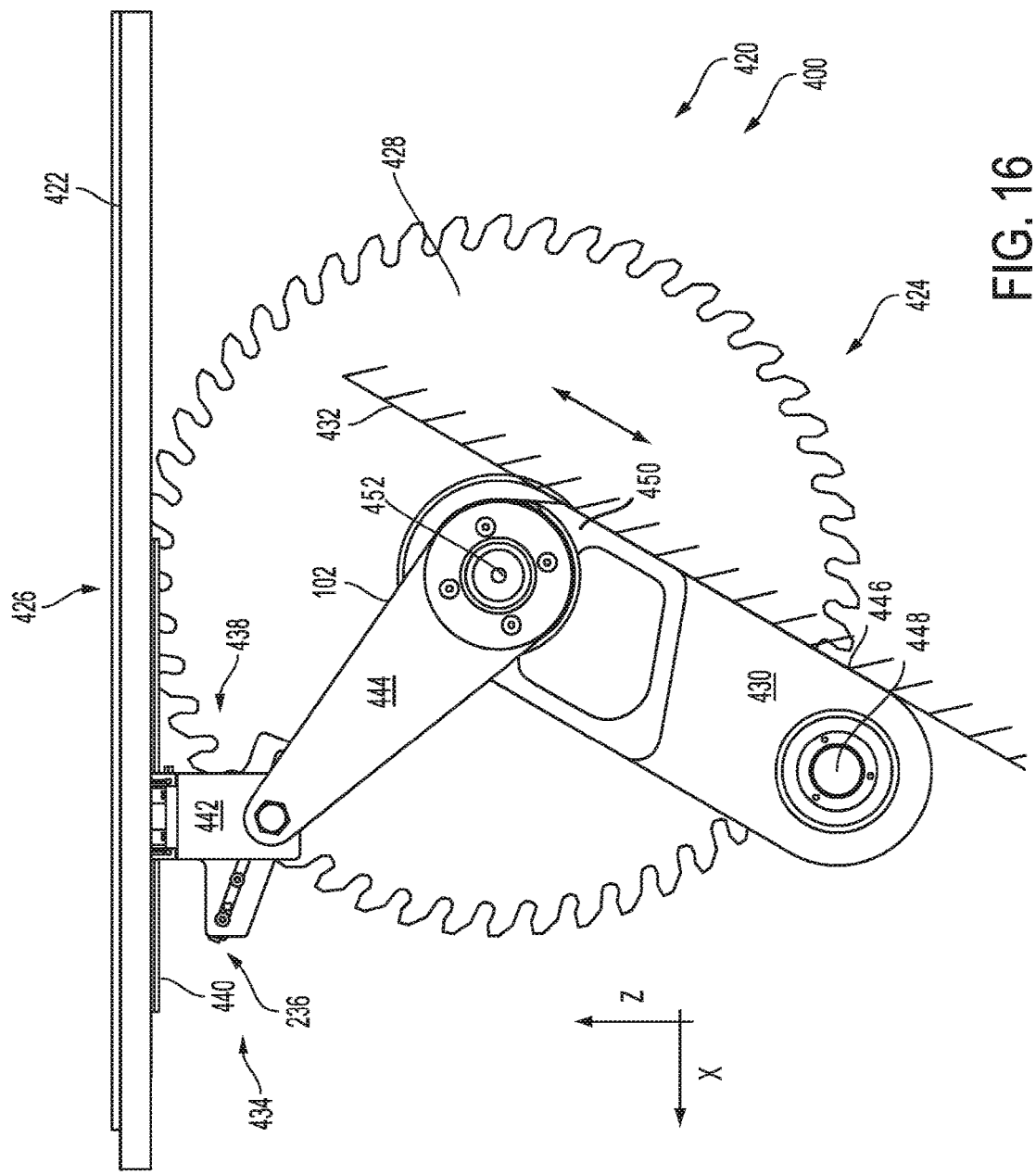
FIG. 16 is a side elevation view of another illustrative saw and lubrication system in accordance with aspects of the present disclosure.

As shown in FIG. 16, this section describes a dynamic saw lubrication system 400 for an up-cut saw, the system including a mechanical linkage coupled to a linear-path (rather than pivoting) traveling arm. Saw lubrication system 400 is an example of lubrication system 10, described above. Additionally, lubrication system 400 includes a mechanical linkage analogous to linkage 100, described above. Accordingly, similar components may be labeled with similar reference numbers.

FIG. 16 shows various aspects of an illustrative saw 420, which includes an embodiment of linkage 100. Apart from the type of mechanical linkage and the travel of the saw blade, saw 420 is substantially identical to saws 220 and 320.

Saw 420 includes a table portion 422 and a saw assembly 424 configured to pass through a slot 426 of table 422 from below. Saw assembly 424 includes a rotatable saw blade 428 attached to a traveling arm 430. In this example, arm 430 is configured to move blade 428 up and down along a slanted linear path, as indicated at 432 in FIG. 16.

Saw 420 includes a lubrication assembly 434, comprising a nozzle 236 and a carriage assembly 438 attached to an underside of table 422 by a linear bearing 440. As in examples described above, carriage assembly 438 may include a bridge portion 442 configured to provide an offset for the nozzle.

Saw 420 further includes a rigid link 444 pivotally (i.e., pivotably) coupled to traveling arm 430 at a first (proximal) end portion 446 by a first pivot joint 448, and to carriage assembly 438 at a second (distal) end portion 450 by a second pivot joint 452. As indicated in FIG. 16, the angled linear movement of arm 430 and blade 428 along path 432

(transverse to the X axis) will be converted into linear movement of carriage assembly 438 along the X axis. Accordingly, the nozzle will be held at a relatively constant distance from the periphery of blade 428.

As should be evident from the description above, traveling arm 430 is analogous to sliding member 106, link 444 is analogous to link 102, and the components of carriage assembly 438 are analogous to sliding member 112 and joint 114.

Illustrative Method

Figure 17:
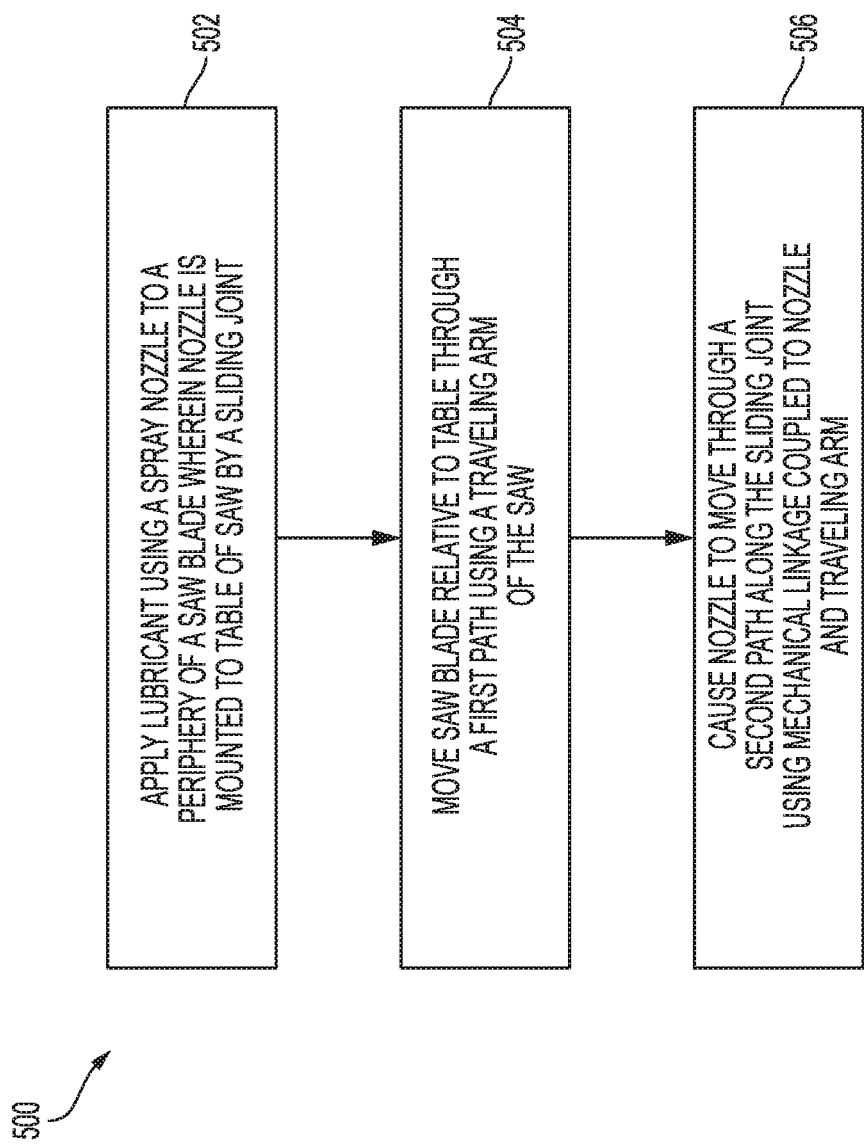
FIG. 17 is a flow chart depicting steps of an illustrative method for lubricating a saw in accordance with aspects of the present disclosure.

This section describes steps of an illustrative method for lubricating the blade of an up-cut saw; see FIG. 17. Aspects of saws and lubrication systems described above may be utilized in the method steps described below. Where appropriate, reference may be made to previously described components and systems that may be used in carrying out each step. These references are for illustration, and are not intended to limit the possible ways of carrying out any particular step of the method.

FIG. 17 is a flowchart illustrating steps performed in an illustrative method, and may not recite the complete process or all steps of the method. FIG. 17 depicts multiple steps of a method, generally indicated at 500, which may be performed in conjunction with dynamic saw lubrication systems according to aspects of the present disclosure. Although various steps of method 500 are described below and depicted in FIG. 17, the steps need not necessarily all be performed, and in some cases may be performed in a different order than the order shown.

Step 502 includes applying lubricant, using a spray nozzle, to a periphery of a circular saw blade mounted to a traveling arm of a saw, wherein the spray nozzle is mounted to a table of the saw by a sliding joint. For example, lubricant may be applied using spray nozzle 236 to the teeth of saw blade 232 mounted to arm 234 of saw 220. In this example, nozzle 236 is mounted to table 222 by a sliding joint at bearing 242, 244.

Step 504 includes moving the saw blade relative to the table through a first path using the traveling arm. In some examples, the first path is arcuate, e.g., when the saw blade is on a pivoting arbor arm. In some examples, the first path is linear. In some examples, the first path is curvilinear, or a combination of linear and arcuate.

Step 506 includes causing the spray nozzle to move through a second path along the sliding joint using a mechanical linkage coupled at a first end to the spray nozzle and coupled at a second end to the traveling arm. In some examples, the second path is linear. In some examples, the mechanical linkage includes a cam mechanism (e.g., mechanism 346). In some examples, the mechanical linkage includes at least one rigid link, wherein a first revolute joint of the rigid link is at the first end of the linkage and a second revolute joint of the rigid link is at the second end of the linkage (e.g., rigid links 246 and 444). In some examples, step 506 may include causing the spray nozzle to maintain a substantially constant distance from the periphery of the saw blade as the spray nozzle moves along the second path.

Additional Examples and Illustrative Combinations

This section describes additional aspects and features of a dynamic saw lubrication system, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

C0. A saw comprising:
a circular saw blade having a major face defining a plane;
an arbor arm having a proximal end portion coupled to an actuator at a fixed pivot joint and a distal end portion rotatably coupled to the saw blade, such that pivoting the arbor arm about the fixed pivot joint causes the saw blade to travel through an arc; and
a lubricator coupled to a linear bearing such that the lubricator is configured to travel along a length of the linear bearing, a long axis of the linear bearing oriented substantially parallel to the plane of the saw blade;
wherein the lubricator is operatively connected to the arbor arm by a mechanical linkage, such that pivoting the arbor arm causes the lubricator nozzle to travel along the linear bearing.

C1. The saw of C0, the mechanical linkage comprising a cam coupled to one of the lubricator or the arbor arm, and a corresponding cam follower coupled to the other of the lubricator or the arbor arm.

C2. The saw of C1, wherein the cam follower is attached to the distal end portion of the arbor arm.

C3. The saw of any of paragraphs C0 through C2, the mechanical linkage comprising a rigid link, wherein the rigid link is coupled to the distal end portion of the arbor arm by a first revolute joint and coupled to the lubricator by a second revolute joint.

C4. The saw of any of paragraphs C0 through C3, wherein the lubricator is carried by a carriage assembly that travels on the linear bearing, and the carriage assembly offsets the lubricator from the mechanical linkage such that the lubricator intersects the plane of the saw blade.

C5. The saw of any of paragraphs C0 through C4, wherein the lubricator comprises a lubricator block having an input port and a plurality of outlet nozzles.

C6 The saw of any of paragraphs C0 through C5, wherein the mechanical linkage is configured to maintain the lubricator at a substantially constant distance from the saw blade as the saw blade travels through the arc.

D0. A lubrication system for an up-cut saw, the lubrication system comprising:
a lubrication nozzle coupled to a bearing carriage of a linear bearing; and
a mechanical linkage having a first end portion coupled to the lubrication nozzle and a second end portion configured to be coupled to an arbor arm of an up-cut saw;
wherein the mechanical linkage is configured to mechanically convert rotational motion of the arbor arm into linear motion of the lubrication nozzle along the linear bearing.

D1. The lubrication system of D0, wherein the mechanical linkage includes a cam and a corresponding cam follower.

D2. The lubrication system of D1, wherein the cam follower is configured to be coupled to a distal end portion of the arbor arm.

D3. The lubrication system of D1, wherein the mechanical linkage further comprises an elastic member biasing the cam follower against the cam.

D4. The lubrication system of D0, wherein the mechanical linkage includes a rigid link connecting a pair of pivoting joints, such that the first end portion of the mechanical linkage includes a first one of the pivoting joints and the second end portion of the mechanical linkage includes a second one of the pivoting joints.

E0. A method for lubricating a saw blade mounted to a traveling arm of a saw, the method comprising:

applying lubricant, using a spray nozzle, to a periphery of a circular saw blade mounted to a traveling arm of a saw, wherein the spray nozzle is mounted to a table of the saw by a sliding joint;

moving the saw blade relative to the table through a first path using the traveling arm; and causing the spray nozzle to move through a second path along the sliding joint using a mechanical linkage coupled at a first end to the spray nozzle and coupled at a second end to the traveling arm.

E1. The method of E0, further including causing the spray nozzle to maintain a substantially constant distance from the periphery of the saw blade as the spray nozzle moves along the second path.

E2. The method of any of paragraphs E0 through E1, wherein the mechanical linkage comprises a cam mechanism.

E3. The method of any of paragraphs E0 through E1, wherein the mechanical linkage comprises at least one rigid link, wherein a first revolute joint of the rigid link is at the first end of the linkage and a second revolute joint of the rigid link is at the second end of the linkage.

E4. The method of any of paragraphs E0 through E3, wherein the first path is arcuate.

E5. The method of any of paragraphs E0 through E3, wherein the second path is linear.

F0. A saw comprising:

a generally planar table having an opening therein;

a circular saw blade having a major face defining a plane, the saw blade configured to pass through the opening in the table;

a traveling arm configured to travel along a linear path oriented at a transverse angle with respect to the table and having a distal end portion coupled to the saw blade, such that traveling along the linear path causes the blade to pass through the opening; and a lubricator configured to lubricate a periphery of the saw blade, the lubricator coupled to a linear bearing oriented parallel to the plane of the saw blade, the linear bearing attached to the table;

wherein the lubricator is operatively connected to the traveling arm by a mechanical linkage, such that moving the arm along the linear path causes the lubricator to travel along the linear bearing.

F1. The saw of F0, the mechanical linkage comprising a rigid link, wherein the rigid link is coupled to the distal end portion of the traveling arm by a first revolute joint and coupled to the lubricator by a second revolute joint.

F2. The saw of any of paragraphs F0 through F1, wherein the lubricator is carried by a carriage assembly that travels on the linear bearing, and the carriage assembly offsets the lubricator from the mechanical linkage such that the lubricator intersects the plane of the saw blade.

F3. The saw of F2, the mechanical linkage comprising a revolute joint attached to the carriage assembly.

F4. The saw of any of paragraphs F0 through F3, wherein the lubricator comprises a lubricator block having an input port and a plurality of outlet nozzles.

F5. The saw of any of paragraphs F0 through F4, wherein the mechanical linkage is configured to maintain the lubricator at a substantially constant distance from the saw blade as the saw blade travels along the linear path.

G0. A saw comprising:

a lubrication nozzle configured to lubricate a periphery of a saw blade of an up-cut saw, the lubrication nozzle being coupled to a sliding bearing defining a first path; and a mechanical linkage having a first end coupled to the lubrication nozzle and a second end coupled to a traveling arm carrying the saw blade of the up-cut saw, wherein the traveling arm is movable along a second path transverse to the first path;

wherein the mechanical linkage is configured to convert motion of the traveling arm along the second path into motion of the lubrication nozzle along the first path.

G1. The saw of G0, wherein the first path is linear and the second path is arcuate.

G2. The saw of G0, wherein the second path is linear.

G3. The saw of any of paragraphs G0 through G2, the mechanical linkage comprising a cam coupled to one of the lubrication nozzle or the traveling arm, and a corresponding cam follower coupled to the other of the lubrication nozzle or the arbor arm.

G4. The saw of G3, wherein the cam follower is attached to an end portion of the traveling arm.

G5. The saw of any of paragraphs G0 through G2, the mechanical linkage comprising a rigid link having a first pivoting joint coupled to the lubrication nozzle and a second pivoting joint coupled to the traveling arm.

G6. The saw of any of paragraphs G0 through G5, wherein the lubrication nozzle is carried by a carriage assembly that travels on the sliding bearing, and the carriage assembly offsets the lubricator from the mechanical linkage such that the lubrication nozzle intersects a plane defined by the second path.

G7. The saw of any of paragraphs G0 through G6, wherein the lubrication nozzle comprises a lubricator block having an input port and a plurality of outlet nozzles.

G8. The saw of any of paragraphs G0 through G7, wherein the mechanical linkage is configured to maintain the lubrication nozzle at a substantially constant distance from the saw blade as the traveling arm moves along the second path.

G9. The saw of any of paragraphs G0 through G8, further comprising a table portion having an opening through which the saw blade is configured to pass, wherein the sliding bearing is attached to a bottom surface of the table portion.

Advantages, Features, Benefits

The different embodiments and examples of dynamic saw lubrication systems, and related methods, described herein provide several advantages over known solutions for lubricating saws having blades that travel. For example, illustrative embodiments and examples described herein result in less waste of lubricating fluid, because the lubricant is more likely to impinge on the saw blade than with a stationary lubricator.

Additionally, and among other benefits, illustrative embodiments and examples described herein result in more consistent lubrication of the saw blade, due to the substantially consistent distance between the lubricator and the blade. This may result in longer life of the saw and/or blade.

Additionally, and among other benefits, illustrative embodiments and examples described herein facilitate the mounting of other mechanisms and devices to the moving carriage assembly, thereby providing a platform for additional functionality.

Additionally, and among other benefits, illustrative embodiments and examples described herein achieve dynamic lubrication by taking advantage of existing movement of the saw assembly, i.e., without the use of electronic controls, motorized location devices, etc.

No known system or device can perform these functions, particularly in up-cut saws. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An up-cut saw comprising:
an arbor defining a rotation axis;
a saw blade mounted to the arbor;
a motor configured to spin the saw blade about the rotation axis, to cut a workpiece;
a lubrication nozzle configured to lubricate a periphery of the saw blade, the lubrication nozzle being coupled to a sliding bearing defining a first path; and
a mechanical linkage having a first end coupled to the lubrication nozzle and a second end coupled to a traveling arm carrying the saw blade, wherein the traveling arm is movable along a second path transverse to the first path;
wherein the mechanical linkage includes a rigid link having a first pivoting joint coupled to the lubrication nozzle and a second pivoting joint coupled to the traveling arm, and wherein the second pivoting joint and the arbor are coaxial with one another.

2. The up-cut saw of claim 1, wherein the first path is linear and the second path is arcuate.

3. The up-cut saw of claim 1, wherein the lubrication nozzle is carried by a carriage assembly that travels on the sliding bearing, and wherein the carriage assembly offsets the lubrication nozzle from the mechanical linkage.

4. The up-cut saw of claim 3, wherein the carriage assembly includes a slotted adjustment feature defining a slot, and wherein the lubrication nozzle is movable along the slot to adjust a distance between the lubrication nozzle and the periphery of the saw blade.

5. The up-cut saw of claim 4, wherein the slot has a first end opposite a second end, wherein the second end is closer than the first end to the rotation axis of the arbor, wherein the up-cut saw further comprises a table portion defining a plane and having an opening through which the saw blade is configured to pass, and wherein the slot is inclined with respect to the plane defined by the table portion such that the distance between the slot and the plane is greater at the second end than the first end of the slot.

6. The up-cut saw of claim 1, wherein the lubrication nozzle comprises a lubricator block having an input port and a plurality of outlet nozzles.

7. The up-cut saw of claim 1, wherein the mechanical linkage is configured to maintain the lubrication nozzle at a substantially constant distance from the saw blade as the traveling arm moves along the second path.

8. The up-cut saw of claim 1, further comprising a table portion having an opening through which the saw blade is configured to pass, wherein the sliding bearing is attached to a bottom surface of the table portion.

9. A method for lubricating the saw blade of the up-cut saw of claim 1, the method comprising:
applying lubricant, using the lubrication nozzle, to the periphery of the saw blade; and
moving the saw blade relative to a table of the up-cut saw along the second path using the traveling arm, such that the lubrication nozzle moves along the first path.

* * * * *